United States Patent
Saner

Patent Number: 5,379,653
Date of Patent: Jan. 10, 1995

[54] FORCE MEASURING DEVICE

[75] Inventor: Kaspar Saner, Dübendorf, Switzerland

[73] Assignee: K-Tron Technologies, Inc., Wilmington, Del.

[21] Appl. No.: 967,432

[22] Filed: Oct. 28, 1992

[30] Foreign Application Priority Data

Oct. 31, 1991 [CH] Switzerland ............. 03184/91

[51] Int. Cl.⁶ ............................................. G01L 1/10
[52] U.S. Cl. ............................... 73/862.59; 73/862.642
[58] Field of Search ............... 73/862.59, 862.642, 73/862.621, 862.637, 862.632; 177/210 FP

[56] References Cited

U.S. PATENT DOCUMENTS

| | | | |
|---|---|---|---|
| 3,335,381 | 8/1967 | Di Giovanni | 338/4 |
| 3,341,795 | 9/1967 | Newman et al. | 73/862.68 X |
| 3,433,064 | 3/1969 | Jacobsen | 73/862.632 X |
| 3,535,923 | 10/1970 | Mortorana et al. | 73/862.642 |
| 3,757,573 | 9/1973 | Pechunk et al. | 73/862.632 X |
| 4,166,997 | 9/1979 | Kisner | 73/862.632 X |
| 4,240,289 | 12/1980 | Saner | 73/862.59 |
| 4,320,667 | 3/1982 | Forrester et al. | 73/862.636 X |
| 4,453,422 | 6/1984 | Yorgiadis | 73/862.632 X |
| 4,587,853 | 5/1986 | Komoto et al. | 73/862.59 |
| 5,088,334 | 2/1992 | Wirth | 73/862.59 |
| 5,095,764 | 3/1992 | Saner | 73/862.59 |

FOREIGN PATENT DOCUMENTS

| | | | |
|---|---|---|---|
| 3924629 | 5/1991 | Germany . | |
| 1290104 | 2/1987 | U.S.S.R. | 73/862.59 |

*Primary Examiner*—Richard E. Chilcot, Jr.
*Assistant Examiner*—Elizabeth L. Dougherty
*Attorney, Agent, or Firm*—Ratner & Prestia

[57] ABSTRACT

A force measuring device has a cell possessing an axis and a ring. The ring is coaxial with the axis and is elastically deformable by shearing as a result of forces which are parallel to the axis and are input into the inner and outer sides of the ring. The resistance is applied to a circuit to generate an electrical signal having a characteristic the value of which corresponds to the applied input force. As an alternative, the transducing element advantageously may be an elongated elastically stretchable carrier member having a strain gage mounted thereon. As a further alternative, the transducing element advantageously may be a piezoelectric crystal, or the like, provided with electrodes. Such a transducing element is mounted and held so as to generate an electrical signal in response to compression forces acting at the two holders.

19 Claims, 4 Drawing Sheets

FORCE MEASURING DEVICE

BACKGROUND OF THE INVENTION

1. Field of the Invention

The invention relates to a force measuring device having a ring which is coaxial with an axis and is connected to one force input member each on its outer side and on its inner side, can be deformed by forces input into it by the force input members and is connected to a transducer.

Such a force measuring device can serve as a weighing cell to the weigher of a metering means or of another weigher.

2. Description of the prior art

A force measuring device disclosed in German Patent number 3,924,629 has a cell with an axis. The one-piece cell has a ring which is associated with one force input member each on its inner surface and on its outer surface. The ring can be deformed by forces parallel to the axis and transmitted to it by the force input members and is connected to a transducer for converting a force into an electrical signal. The transducer has wire strain gages which are fastened on the two opposite end faces of the deformable ring.

If, when such a force measuring device is used, for example, the annular or jack-like, outer force input member connected to the outer surface of the deformable ring rests on a fixed support and a compressive force directed vertically downward acts on the inner force input member connected to the inner surface of the deformable ring, the ring is deformed. In the ideal case, this deformation is identical along the entire ring circumference. If, however, the compressive force acts slightly eccentrically relative to the axis, the force or force density exerted on the ring also has different magnitudes along its circumference. Accordingly, the ring is nonuniformly greatly deformed along its circumference, with the result that measuring errors may occur. As disclosed in the cited German Patent No. 3,924,629, wire strain gages should furthermore be tightly sealed off from the environment. The force measurements carried out using wire strain gages are moreover very sensitive to changes in the electrical supply or reference voltage and to temperature changes. Moreover, such measurements may be influenced by the contact resistances of electrical connections and by any contact voltages generated at such connections. When wire strain gages are used, expensive measures are required in order to permit exact measurements, so that the production of force measuring devices permitting exact measurements is relatively expensive particularly in small numbers.

Force measuring devices having a transducer which possesses at least one string which vibrates during the measurement have also been disclosed. For example, U.S. Pat. No. 5,095,764 discloses transducers having a force transmission device which possesses two laminae arranged a distance from one another. Together with pins connecting them, they form holders which hold the string. If a force to be measured is input into the force transmission device during a measurement, this results in a change in the distance between the two holders.

The transducers of these known force measuring devices having a string are suitable for the measurement of forces which act on the force transmission device and which are relatively small and are, for example, not more than 50 to 100N. However, there is a need for measuring also substantially larger forces. Such a need exists, for example, in force measuring devices which are used in gravimetric metering devices for weighing a storage container.

Various force measuring devices which have a transducer possessing at least one string and one force transmission device which permits a rather large force reduction is also known. U.S. Pat. No. 4,240,289 discloses, for example, force meters comprising a frame and a load support which is guided by means of a parallel guide thereof and is connected by a first string to the frame via a second, weaker spring to the string of the transducer. However, these and other, more or less similar force measuring devices occupy rather a large amount of space. In the case of a force measuring device intended for gravimetric metering means and in the case of many other possible uses of such a device, it is however desirable if the force transmission device used for force reduction and the transducer are as small and compact as possible.

SUMMARY OF THE INVENTION

It is an object of the invention to provide a force measuring device which makes it possible to avoid disadvantages of the known force measuring devices. It should be possible in particular also to be able to use transducers having a string and as far as possible substantially to avoid a situation where, as in the force measuring device according to German Patent No. 3,924,629, a deformation which is nonuniform along the circumference of the deformable ring is caused by this measuring error.

This object is achieved by a force measuring device having a ring which is coaxial with an axis and is connected to one force input member each on its outer side and on its inner side, can be deformed by forces input into it by the force input members and is connected to a transducer, wherein the ring is connected to the transducer via a transmission device which has at least one frame and two straps, wherein the frame is connected to the ring at first connecting points distributed along its circumference and wherein each strap is connected to the frame at second connecting points a distance away from the first connecting point and to the transducer at the third connection point.

The force measuring device has a ring which is deformable by forces parallel to its axis and in fact may be elastically deformed by shearing. The force transmission device belonging to the force measuring device possesses at least one frame and preferably two frames a distance away from one another along the axis of the ring. The or each frame is connected to the deformable ring at first connecting points. The number of these first connecting points is preferably $2^n$, where n is preferably a number which is an integer, even and at least 2. The or each frame is coordinated, at second connecting points, with two straps, each of which is connected to a transducer at the third connecting point. Said transducer, preferably together with electronic circuit means, can generate an electrical signal as a measure of a force to be measured.

In addition to the first force transmission device already mentioned, a second force transmission device belonging to the transducer is also preferably present. The transducer preferably has a transducing element which is held by this device and consists of a metallic electrically conducting material and of which at least one section is elongated and, at least in the rest state, straight. The transducer preferably also has at least two and, for example, four permanent magnets which generate at least one magnetic field intersecting the stated section of the transducing element. Such section of the transducing element can then form a string which vibrates during the measurement and whose vibration frequency is a measure of the force applied to it and hence of the force to be measured. The use of a transducer having a string permits exact force measurement at relatively low costs for the production of the transducer and of the electronic circuit means required for operating it.

The various parts of the transducer may be, for example, identical or similar to transducers described in U.S. Pat. No. 5,095,764 already cited. This publication is therefore expressly incorporated by reference.

BRIEF DESCRIPTION OF THE DRAWINGS

The subject of the invention is now described in detail with reference to embodiments shown in the drawings. In the drawings.

DESCRIPTION OF THE PREFERRED EMBODIMENTS

Figure 1:
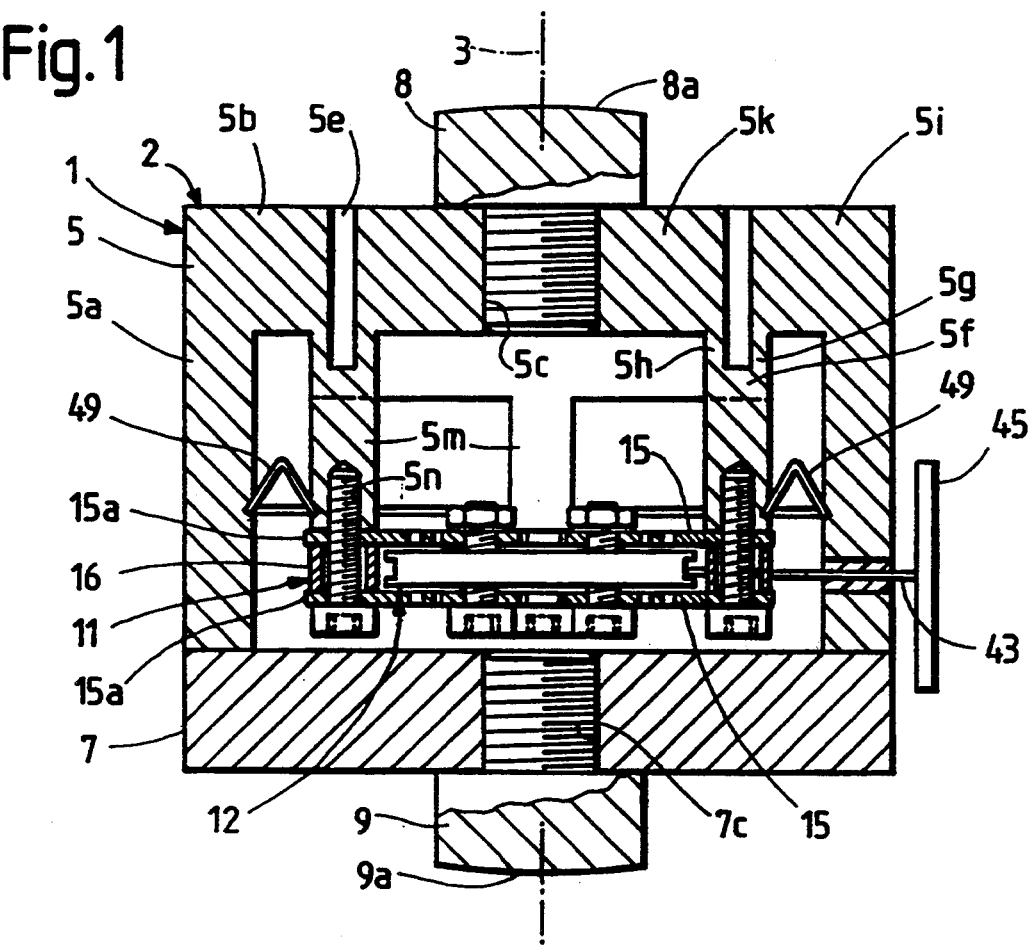
FIG. 1 shows a simplified vertical section through a force measuring device.
Figure 2:
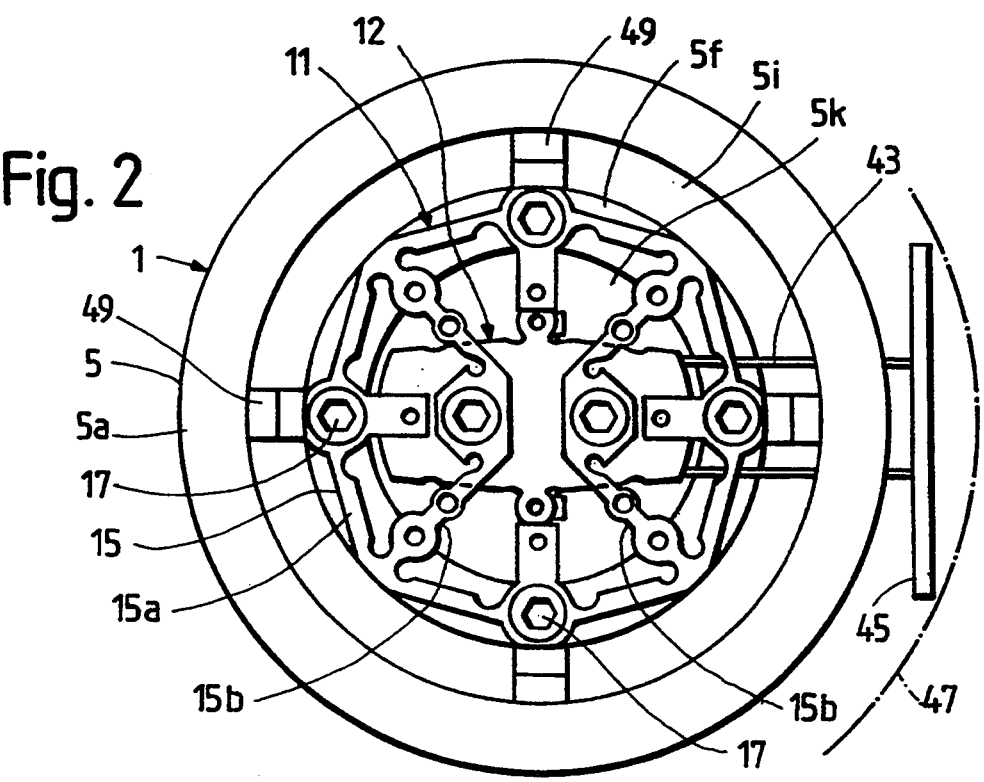
FIG. 2 shows a simplified view, from the lower side of FIG. 1, of the force measuring device with the force distributor removed.

The force measuring device 1 shown in FIGS. 1 and 2 has a measuring chamber 2 possessing a vertical axis 3 and a cell 5 which at least in general is rotationally symmetric therewith. Said cell is formed from a one-piece, metallic body and possesses a jacket 5a and an end wall 5b coordinated with its upper end. Said end wall has, in its centre, a hole 5c which is coaxial with the axis 3 and is provided at least partly with an internal thread. The cell 5 furthermore has an annular projection projecting downward from the inner surface of the end wall 5b into the interior of the cell. The end wall 5b is provided with an annular groove 5e which projects from the outer surface of the end wall into the annular projection. The latter therefore forms an elastically deformable ring 5f which encloses the axis 3 and is coaxial with it. In the undeformed state, said ring 5f has a cylindrical lateral surface on the inside or outside and, on its edge facing away from the end wall 5b, a flat end face radial with respect to the axis 3. On its outer side—i.e. at its outer lateral surface—and on its inner side—i.e. at its inner lateral surface —the ring 5f is coordinated with the end wall 5b via a flexural joint 5g and 5h, respectively. The jacket 5a and that annular region of the end wall 5b which is located outside the annular groove 5e together form an outer, essentially rigid force input member 5i. That region of the end wall 5b which is located inside the annular groove 5e serves as an inner, essentially rigid force input member 5k. The cell 5 has four arms 5m which are distributed uniformly along the circumference of the ring 5f, are coordinated therewith and, in the undeformed state thereof, project away from the end face of the ring, parallel to the axis 3. Each of these arms is provided with threaded bore 5n which is parallel to the axis 3 and ends at a flat end surface present at the free end of the arm.

The measuring chamber 2 has a laminar, metallic force distributor 7 which is coaxial with the axis 3 and at least substantially rotationally symmetric. Said force distributor is adjacent to the end surface of the jacket 5a and is rigidly and detachably connected to the jacket 5a by means of screw connections which are not shown. The force distributor 7 possesses, in its centre, a hole 7c which is coaxial with the axis 3 and is provided at least partly with an internal thread.

A metallic pin 8 or 9 which has a head projecting from the end wall 5b or from the force distributor 7 outward, i.e. upward or downward, is screwed into each of the two holes 5c, 7c. Said head has a convex end face 8a or 9a at its end facing away from the cell 5.

Figure 3:
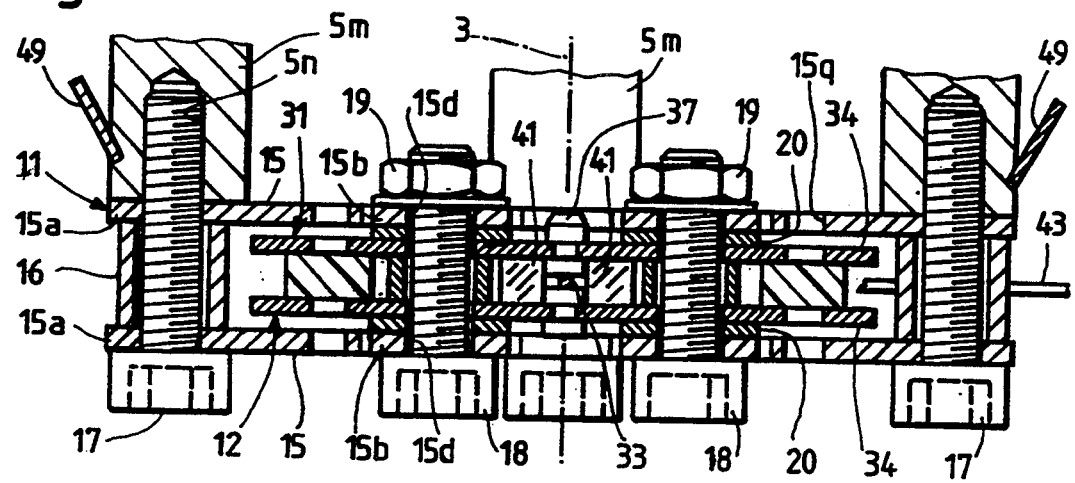
FIG. 3 shows a section from FIG. 1, which is also somewhat simplified and is on a larger scale.
Figure 4:
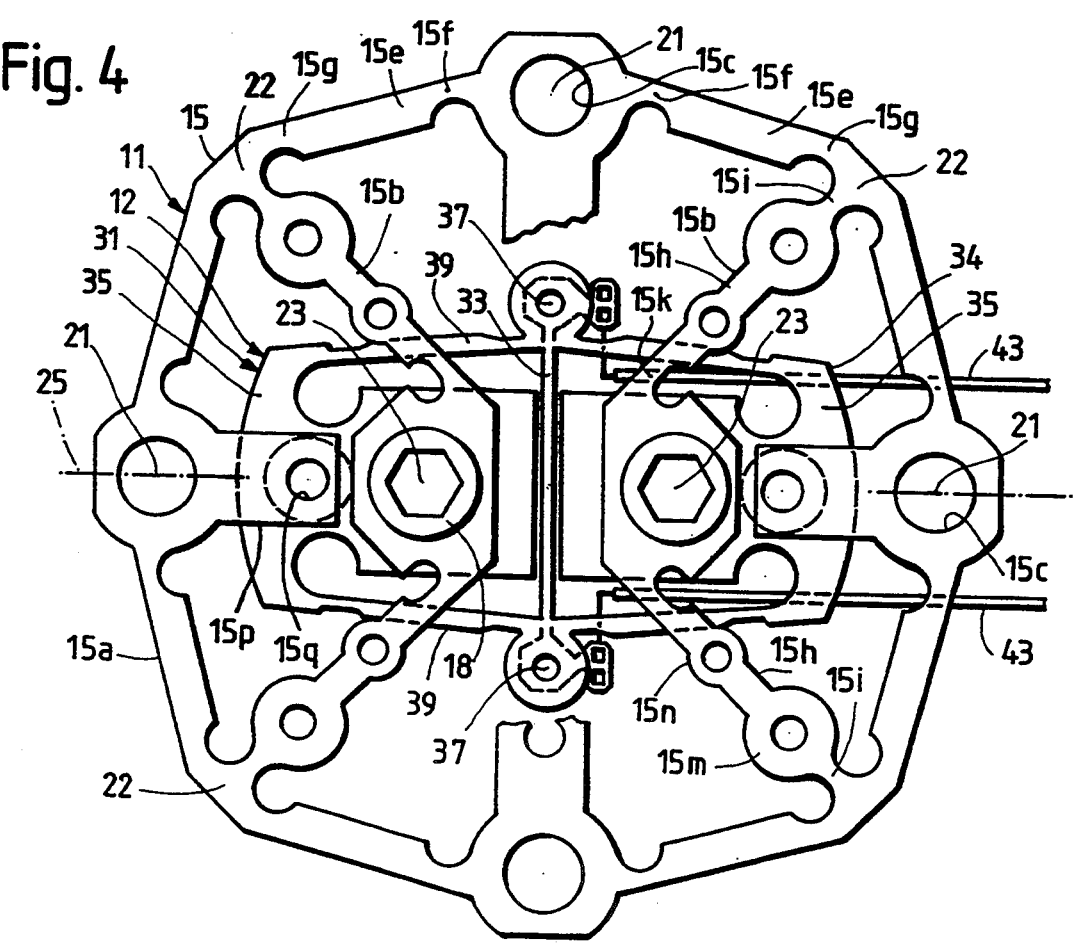
FIG. 4 shows a view, corresponding to FIG. 2, of some parts shown in FIG. 2, on the same scale as in FIG. 3.

The deformable ring 5f is connected via a first force transmission device 11 to a transducer 12, of which, for better clarity, only the outlines are shown in FIGS. 1 and 2. The first force transmission device 11 and the transducer 12 are shown particularly clearly in FIGS. 3 and 4. The first force transmission device 11 has two one-piece metallic laminae or plates 15 which are a distance from one another along the axis 3, are flat and parallel to one another at least in the undeformed state and are at right angles to the axis 3 and each of which forms a frame 15a and two straps 15b coordinated therewith. The centers of the two frames lie on the axis 3. The frames 15a and straps 15b coincide with one another in a projection parallel to the axis 3. Each frame has four eyes which are distributed uniformly along its circumference and whose through-holes 15c are aligned with one another in pairs parallel to the axis 3. For each pair of holes 15c which are aligned with one another, a spacer sleeve 16 is arranged between the two frames 15a. Furthermore, the first force transmission device 11 is detachably and rigidly fixed to one of the arms 5m at each pair of holes 15c aligned with one another, by means of a screw 17 which passes through said holes and the spacer sleeve 16 and is screwed into a threaded bore 5n. Each strap 15b has two ends coordinated with one of the frames 15a, projects into the interior space enclosed by said frame and has, at its apex, an eye having a through-hole 15d. The transducer 12 is located between the two laminae 15 and is detachably connected to the two straps 15b by two screws 18 each passing through a pair of holes 15d aligned with one another and by associated nuts 19. A washer or a spring washer 20 which holds the transducer a distance away from the relevant strap is present between each strap 15 and that side of the transducer 12 which faces said strap.

The two frames 15a are thus connected by the arms 5m to the deformable ring 5f, in each case at four first connecting points 21 defined by the holes 15c. Furthermore, each strap 15b is connected to one of the frames 15a at two second connecting points 22 which are located along the frame circumference on different sides of one and the same connecting points 21, between the latter and a first connecting point 21 adjacent to it. The holes 15d define third connecting points 23 at which the straps 15d are connected to the transducer 12. The connecting points 21, 22, 23 coincide with one another in pairs when viewed in a direction parallel to the axis 3.

Each frame 15a has, between a first connecting point 21 and each second connecting point 22 adjacent thereto, a straight limb 15e which is connected via a flexural joint 15f or 15g to the frame section containing the first or second connecting point, respectively. Each strap 15b has two straight limbs 15h which make an angle with one another. Each limb 15h is connected via a flexural joint 15i to a frame section forming one second connecting point 21 and via a flexural joint 15k to the strap section containing the third connecting point 23 of the relevant strap. The flexural joints 15f, 15g, 15i, 15k are each formed by a constriction. Each limb 15h of the straps 15b also has at least one eye, namely two eyes 15m, 15n, each of which is formed by a circular extension having a circular hole. Furthermore, a tab 15b projecting toward the center of frame 15a and having a hole 15q is present at each eye of each frame 15a, which eye defines a hole 15c.

The first connecting points 21 and the second connecting points 22 together define a polygon, namely an octagon. All first and second connecting points in succession along the circumference of a frame are the same distance from one another. However, the second connecting points 22 are further from the center of the relevant frame and the axis 3 passing through it than the first connecting points 21. Each pair of adjacent limbs of the polygon or frame 15a makes an angle whose apex projects outward away from the center of the polygon or center of the frame and hence from the axis 3. In other words, each first or second connecting point together with the two second or first connecting points adjacent to it defines an isosceles triangle whose apex which is in the middle along the frame circumference and is opposite the longest side of the triangle projects outward away from the center of the frame 15a. The angles made by a pair of limbs of the polygon or frame are larger in the case of the first connecting points 21 than in the case of the second connecting points 22 and are, for example, about 140° to 160° in the case of the first connecting points and, for example, about 110° to 130° in the case of the second connecting points. The two third connecting points 23 of each lamina 15 lie in a plane 25 which passes through the axis 3 and two first connecting points 21 of each lamina 15.

The transducer 12 has a second force transmission device 31 and a transducing element 33 held by said device. The second force transmission device 31 has two one-piece metallic laminae 34 which are parallel to one another, a distance from one another along the axis 3 and connected firmly to one another at certain points. The two frame-like laminae 34, together with the parts holding them a distance apart, form two connecting members 35. Each connecting member 35 is connected by one of the above-mentioned screws 18 to two straps 15b. The second force transmission device 31 furthermore has two holders 37, each of which is formed by sections of the two laminae 34 and by an electrically insulating pin. Furthermore, four elongated transmission members 39 which are formed by the two laminae 34 are present, which transmission members connect the two connecting members 35 via flexural joints to the holders 37 in such a way that the change in the distance between the two connecting members 35 causes a change in the distance between the two holders 37.

As already described in the introduction, the various parts of the transducer 12 may be identical or similar to the corresponding parts of transducers described in U.S. Pat. No. 5,095,764, in particular of the embodiment described first in this publication. It should furthermore be noted here that the transducer 12 is not only greatly simplified in FIGS. 1 and 2 but is also slightly simplified in FIGS. 3 and 4, and that the two connecting members 35 of the transducer 12 in the cited publication are designated as reference member and force transducer.

The elongated, one-piece electrically conducting transducing element 33 has a string-forming section which is straight in the rest state and is at right angles to the plane 25 and, at both ends thereof, an eyelet which is held on the pin by one of the two holders 37. The transducer also has four permanent magnets 41 which are held between the two laminae 34 and which generate magnetic fields intersecting the string. Electrical conductors 43 are soldered to the two eyelets of the transducing element 33, said conductors being connected through a hole present in the jacket 5a to a circuit card of an electronic device, which circuit card is shown in FIGS. 1 and 2.

In accordance with a further aspect of the invention, the string of transducing element 33 is held in place by the second force transmitting mechanism 31, and the magnets 41 which generate a magnetic field crossing the string so that the string 33 vibrates during measurement at one of its resonant frequencies, such as its second natural frequency. This frequency is proportional to the square root of the stretching or tensioning force acting at the ends of the string. This force has two components, a constant force component generated by applying to the string 33 an initial tension, or pretension; and a variable force component proportional to the input force applied to the string by the second force transmitting mechanism 31. An electronic device electrically connected with the two ends of the string 33 is adapted to cause the string to vibrate, and to calculate a variable related to the frequency of vibration of the string, for example the time-duration of a period of vibration; or alternatively, a group of such variables. This variable will then represent a measure of the tensioning or stretching force acting on the string and, at the same time, of the input force, related to the tensioning force, as exerted upon the force input member. The circuit card is fastened, for example, to an annular housing which is indicated only partly and schematically by a dash-dot line in FIG. 2 and in which the cell 5 and force distributor 7 are held in such a way that transmission of the force to be measured is not adversely affected. A V-shaped, springy bimetallic element 49 whose ends are held in necks of the jacket 5a or of the relevant arm 5m is present in the interior of the cell 5, between its jacket 5a and each of the four arms 5m.

The cell 5 and the force distributor 7 consists, for example, of an aluminum alloy which has a relatively high strength. The pins 8 and 9 consist, for example, of steel, namely a stainless, hardened steel. The laminae 15 and 34 of the two force transmission devices 11 and 31 and the transducing element 33 consist, for example, of copper beryllium bronze. Otherwise, the connections between the cell 5, the force distributor 7 and the pins 8, 9 are sealed by sealing means which are not shown. Furthermore, the passage for the conductors 43 through the jacket 5a is also sealed, so that the interior of the measuring chamber is sealed off in a water-tight manner from the environment.

Figure 5:
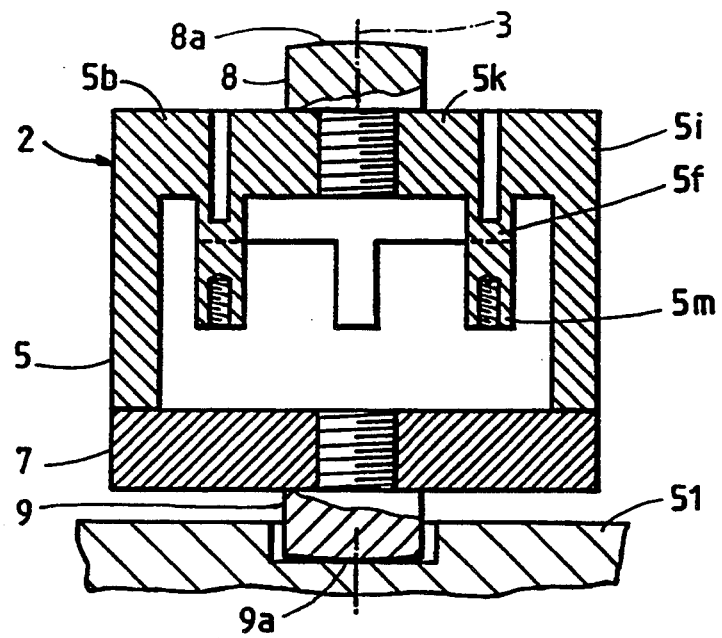
FIG. 5 shows a vertical section through some parts of the force measuring device on a somewhat smaller scale than FIG. 1, in the unloaded state.

The mode of action of the deformable ring 5f will now be explained with reference to the force measuring device shown in simplified form and partially in FIGS. 5 and 6. The lower pin 9 of the force measuring device projects, with a little radial play, into an indentation in a support 51 and rests with its curved end face 9a on the bottom surface of the indentation. In FIG. 5, the cell is in the unloaded state. On the other hand, in FIG. 6, a force $F_1$ to be measured and directed parallel to the axis 3 is exerted on the apex of the curved end face 8a of the upper pin 8 by a member which is not shown. This force is distributed around the axis 3 by the inner force input member 5k and is transmitted via the flexural joint 5h to the inner side or surface of the deformable ring 5f. The support 51 exerts, on the pin 9, a reaction force which has the same magnitude as the force $F_1$ and is distributed by the force distributor 7 and the outer force input member 5i around the axis 3 and is transmitted via the flexural joint 5g to the outer side or surface of the deformable ring. Forces which are parallel to the axis 3 on the inside and the outside but are opposed to one another thus act on said ring. These forces deform the ring elastically through shearing, so that the lower, free end face of the ring 5f is inclined outward toward the end wall 5b and the outer edge of the ring 5f and especially the arms 5m are spread outward.

Figure 7:
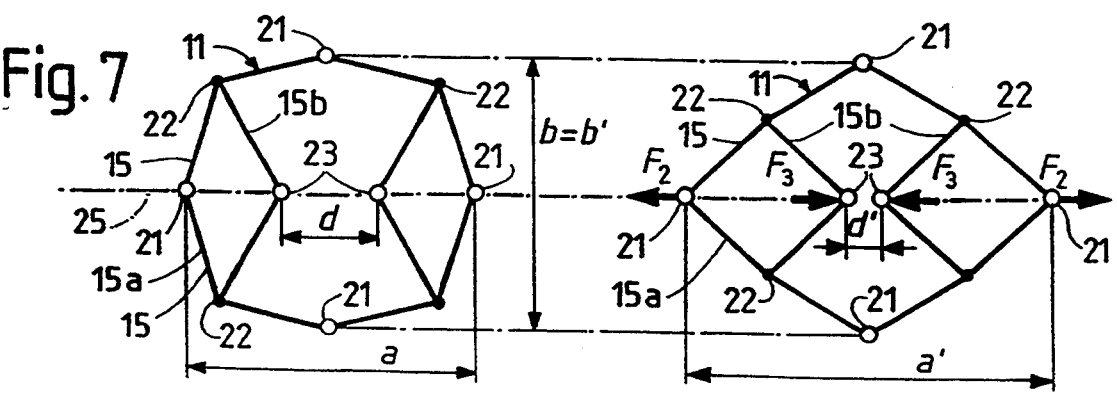
FIG. 7 shows a diagramatic view of parts of a force transmission device belonging to the force measuring device and FIG. 8 shows a schematic view of parts of a variant of a force transmission device.

The mode of action of the first force transmission device 11 will now be explained with reference to FIG. 7. The left-hand part of the diagram in FIG. 7 shows a highly schematic plan view of the frame 15a formed by a lamina 15 and the two straps 15b of the first force transmission device 11 in the undeformed state, which straps are coordinated with said frame. Limbs of the frame 15a and the strap 15b are represented by lines, the first and third connecting point 21 and 23, respectively, by empty circles and the second connecting points 22 by solid dots. In the left-hand part of the diagram in FIG. 7, the distances of the two pairs from diametrally opposite first connecting points 21 are noted by a and b, where a=b. The distance between the two third connecting points 23 is furthermore denoted by d in the left-hand part of the diagram.

It is now assumed that the deformable ring 5f is deformed by a force acting on it in such a way that it forces apart, with a force $F_2$, the first connecting points 21 lying in the plane 25 and associated with the two frames 15 arranged one on top of the other, in accordance with the right-hand part of the diagram in FIG. 7. Consequently, the frame 15d is stretched along the plane 25 so that the distance between the first connecting points lying in this plane is increased to a'. Furthermore, it is initially assumed that the distance b' between the two other first connecting points 21 of the deformed frame is equal to the corresponding distance b of the undeformed frame. In this deformation of the frame 15a, the angles made by the frame limbs at the second connecting point 22 are stretched—i.e. increased—to a greater or lesser extent, and the second connecting points 22 are therefore shifted toward the plane 25. This shift in the second connecting points 22 in turn causes the two third connecting points 23 to approach one another, so that the distance between them decreases to the value d'. The third connecting points 23 then transmit a force $F_3$ to the connecting members 35 of the transducer 12. Consequently, these are forced toward one another so that the distance between them decreases. This decrease in distance in turn causes an increase in the distance between the two holders 37, so that the string of the transducing element 33 is placed on a greater tension and its vibration frequency changes during the measurement.

Figure 6:
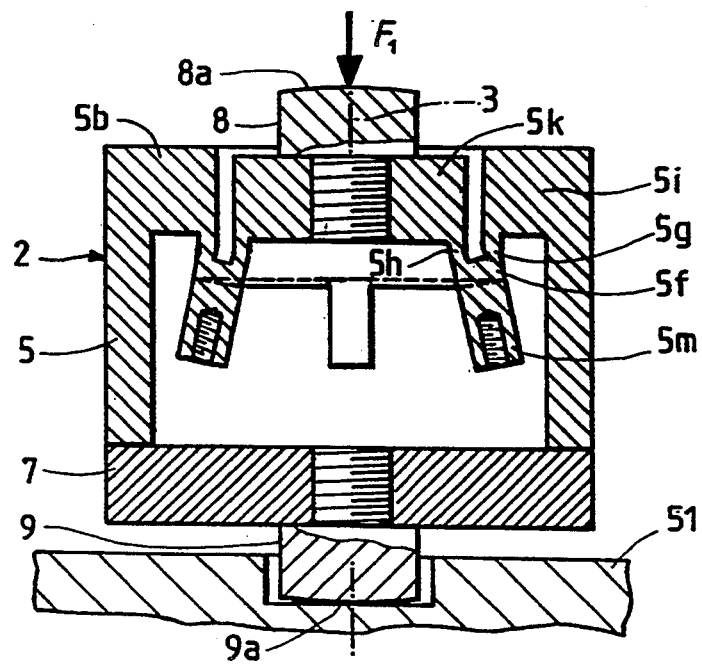
FIG. 6 shows a vertical section through the parts shown in FIG. 5, but in the loaded state.

It may also be noted here that the deformations of the cell 5 in FIG. 6 and of the lamina 15, belonging to the first force transmission device 11, in FIG. 7 have been shown in very greatly exaggerated form. In reality, these deformations are very small and practically only of a virtual type, so that the force measuring device permits force measurement with almost no displacement. If the arms 5m are spread apart during measurement of the force, as shown in greatly exaggerated form in FIG. 6, the laminae 15 which are flat in the undeformed state are furthermore curved slightly. However, this curvature is very small.

It has previously been assumed that, of four first connecting points 21 of a frame 15a, the deformable ring 5f shifts only the two which lie in the plane 25. If, however, a force $F_1$ according to FIG. 6 acts on the cell 5 of the axis 3, the ring 5f is elastically deformed rotationally symmetrically with respect to the axis 3, so that all four first connecting points 21 of a frame 15a are moved away from the center of such ring. The two third connecting points 23 are also brought closer to one another in the case of such a deformation of a frame 15a.

In the ideal case, the force $F_1$ to be measured and the reaction force generated by it on the support 51 act exactly at the axis 3 and/or in an area exactly coaxial with said axis, on the pins 8 and 9. The force $F_1$ and the said reaction force are then distributed exactly uniformly around the axis along the circumference of the ring 5f, so that the latter is deformed exactly rotationally symmetrically with respect to the axis 3 and thus exactly uniformly along its circumference. However, owing to the play required in the case of movable parts, owing to manufacturing tolerances and for other reasons, in practice the force $F_1$ to be measured and its reaction force may act on the pins 8 and 9 slightly eccentrically with respect to the axis 3. Accordingly, the forces acting on the cell 5 and in particular those acting on the ring 5 are no longer exactly uniformly distributed around the axis 3, so that the ring is deformed differently along its circumference. The frames 15a and the straps 15b of the first force transmission device 11 can, however, substantially compensate nonuniform deformations, i.e. shearings—of the ring 5f, so that the ratio $F_3/F_1$ is at least almost independent of whether the force distribution in the cell 5 of the measuring chamber 2 is exactly rotationally symmetric with respect to the axis 3 or not. By means of the first force transmission device 11, it is therefore possible, at least substantially, to prevent nonuniform deformations of the ring 5f from causing measurement errors.

The force reduction achievable by the cell 5 and in particular by the elastically deformable ring 5f belonging to said cell and by the arms 5m depends on the dimensions of the cell 5 and especially of the ring 5f and of the arms 5m and on the elastic properties of the material forming the cell, especially on the shear modulus. The ring which is elastically deformable by shearing can result in, for example, a force reduction in the range from 10 to 1000. The first force transmission device is, for example, a 2-fold to 3-fold force reduction. The ratio of the force transmitted to the transducer 12 to the force input into the cell may thus be, for example, approximately in the range from 1:20 to 1:3000.

If, during measurement, the limbs 15h of the straps 15b transmit compressive forces parallel to their longitudinal directions to the transducer 12, their eyes 15m, 15n which are essentially circular in the undeformed state may be deformed slightly into an oval. The eyes 15m, 15n thus act more or less as compression springs and absorb part of the stated compressive force. If it is intended to produce small series of measuring devices resulting in different force reductions, it is therefore possible first to produce a relatively large number of identical laminae whose eyes 15m, 15n have only relatively small holes and then, if necessary, to enlarge said holes by drilling in order to establish the required force reduction. This possibility allows the economical production of force measuring devices intended for the measurement of maximum forces of different magnitudes, even in small numbers. The holes 15q of the tabs 15p through which the plane 25 passes are coaxial with the holes in the laminae 34 of the transducer 12. In the connection of the two laminae 15 to the previously assembled transducer 12, the tabs 15p and their holes 15q serve as mounting aids which facilitate correct positioning of the laminae 15 and of the transducer.

As already mentioned in the discussion of the prior art comprising such a transducer, the transducer 12 can be formed so as to measure forces which are transmitted to its connecting members and whose maximum value is in the range from 50N to 100N. The force measuring device can accordingly be designed to measure forces $F_1$ whose maximum value is, for example, in the range from about 1 kN to 300 kN. The measuring chamber 2 can be relatively small and compact. The external diameter of the measuring chamber 2 may be approximately or less than 100 mm and, for example, 80 to 90 mm. The axial external dimension of the measuring chamber 2 without the pins 8 and 9 may be at most 75 mm and, for example, 50 to 65 mm.

For example, measuring devices acccording to the invention are suitable, in the case of gravimetric metering means, for weighing a storage. container in which a material to be metered is stored, which material is conducted and/or conveyed out of the storage container. The storage container to be weighed may be supported, for example, by the pins 8 of three measuring chambers 2 whose pins 9 rest on a fixed support formed by a frame or base.

The coefficient of thermal expansion of the aluminum alloy forming the cell 5 is greater than that of the copper beryllium alloy which forms the laminae 15 of the first force transmission device 11 and also the laminae 34 of the second force transmission device 31 and the transducing element 33. Hence, if the ambient temperature of the measuring chamber 2 changes and, for example, increases, and the temperature of the cell 5 and that of the laminae 15 also increase correspondingly, the ring 5f experiences a greater percentage extension than the frame 15a. If the bimetallic elements 49 were not present, the result of the temperature increase would be that the ring 5f would exert thermally generated forces on the first force transmission device 11 at the first connecting points 21. During measurement of the force $F_1$, these forces would add to the forces exerted on the first force transmission device owing to said force $F_1$. However, the V-shaped, springy bimetallic elements are formed in such a way that they are spread by a temperature increase and thus exert on the arms 5m compressive forces which compensate the forces which are generated by the different extensions of the ring 5f and of the frames 15a.

Figure 8:
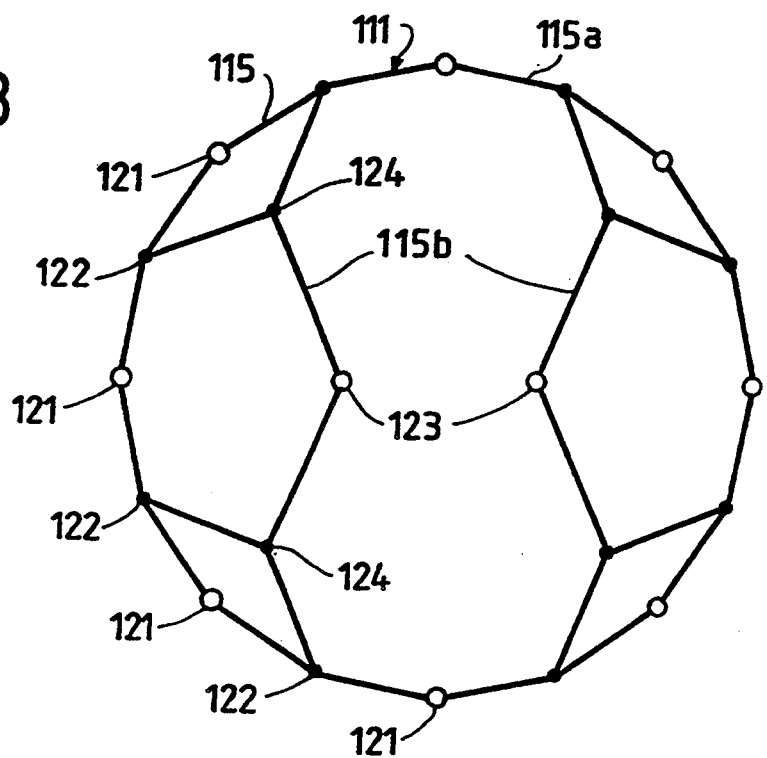

Parts of a variant of a first force transmission device are shown schematically in FIG. 8 and are denoted here by 111. The force transmission device 111 has two one-piece laminae or plates 115 arranged one on top of the other, each of which forms a frame 115a and two straps 115b, whose limbs are shown merely by means of lines, as in FIG. 7. The frame 115a has sixteen limbs and is detachably connected to a deformable ring by means of screws at eight first connecting points 121. A second connecting point 122 is located between each pair of first connecting points 121, a second connecting point 122 and the two first connecting points 121 adjacent thereto forming the apices of a triangle, analogously to the frame 15a.

Each strap 115b has, at each end, two limbs, one end of which is coordinated with the frame 115a at one of the second connecting points 122. Each strap furthermore possesses two middle limbs, one end of each of which limbs is connected to a strap section which contains a third connecting point 123 and is detachably connected to a transducer by means of a screw. Each middle strap limb is connected, at its end opposite the third connecting point 123, to two limbs located at one strap end, in a fourth connecting point 124. The connections of the limbs of the frame and of the straps to a lamina section forming a connecting point are formed by flexural joints, analogously to the laminae 15.

A first force transmission device 115 having two laminae 115 can transmit forces from a deformable ring to a transducer, similarly to the first force transmission device 11 described above. The force transmission device 111 permits even better compensation of a nonuniform deformation of the deformable ring in the force transmission device 11 but is more complicated and more expensive than the latter.

In the case of undeformed frame 115, its connecting points 121 and 122 together form a regular polygon—namely a hexadecagon—and accordingly are all the same distance from the center of the frame. However, it would of course be possible to arrange the second connecting points 122 of the frame 115, analogously to those of frame 15, a greater distance away from the frame center than the first connecting points 121. Conversely, the four second connecting points 22 of the frame 15 can be arranged at the same distance from the frame center as the four first connecting points. Furthermore, the second connecting points of a frame can even be arranged closer to its center than the first connecting points.

Instead of using a string vibrating during measurement, an electrically conducting straight wire may be used as the transducing element which, when elastically stretched by a variable tension force applied at its ends would have its electrical resistance correspondingly changed. The instantaneous electrical resistance is applied to a circuit to generate an electrical signal having a characteristic the value of which corresponds to the applied input force. As an alternative, the transducing element advantageously may be an elongated elastically stretchable carrier member having a strain gage mounted thereon. As a further alternative, the transducing element advantageously may be a piezoelectric crystal, or the like, privided with electrodes. Such a transducing element is mounted and held so as to generate an electrical signal in response to compression forces acting at the two holders.

The force measuring devices can also be changed in other respects. For example, it would be possible to replace the elongated arms 5m by short projections or even to omit them altogether, and then to fix the first force transmission device 11 to these projections or directly to the deformable ring. Furthermore, it would be possible to provide a first force transmission device which has only a single lamina which forms a frame and two straps coordinated therewith. Moreover, it would be possible to replace the screws 17 and/or the screws 18 by connecting means permitting the rivet and/or press-stud connections.

The bimetallic element 49 can be arranged not on each arm but only on two arms which, for example, are diametrally opposite, or even only on a single arm. In addition, instead of or in addition to the bimetallic element 49, it is possible to provide at least one temperature sensor in order to measure the temperature of the cell and/or directly that of the deformable ring and/or directly that of the first force transmission device. The or each temperature sensor can then be connected to an electronic circuit means which is formed to compensate the forces generated by temperature changes, during evaluation of the electrical signals applied by the transducing element.

What is claimed is:

1. A force measuring device, comprising:
   (b) means for applying the tensioning force to the transducing element when input forces are transmitted to the tranducer; and
   (5) a force transmission device which transmits the input forces from the ring to the transducer when the ring is deformed,
      (a) the force transmission device having a frame and two straps,
      (b) the frame being connected to the ring at first connecting points distributed along a circumference of the frame to deform said frame when said ring is deformed,
      (c) each strap being connected to the frame at a respective second connecting point a distance away from the first connecting points, and
      (d) each strap being connected to the transducer at a third connecting point to transmit the input forces from the frame to the transducer via the straps when the frame is deformed.

2. A force measuring device as claimed in claim 18, wherein the frame and the straps are included in a one-piece lamina, the lamina has sections that include the first, second and third connecting points, and the frame and the straps have limbs which are connected via flexural joints to the lamina sections.

3. A force measuring device as claimed in claim 18, wherein each second connecting point together with the two first connecting points adjacent thereto defines a triangle having an apex formed at the second connecting point, the apex projects away from the axis, and the third connecting points are located inside the frame.

4. A force measuring device as claimed in claim 3, wherein the second connecting points are a greater distance away from the center of said frame than the first connecting points when the frame is in the rest state.

5. A force measuring device as claimed in claim 18, wherein the number of first connecting points is $2^n$ where n is an even integer having a value greater than one.

6. A force measuring device as claimed in claim 18, wherein:
   (1) the force transmission device has two frames which are a distance apart from one another along the axis and are each connected to two straps,
   (2) the transducer is located between the straps connected to the two frames,
   (3) the two frames are connected to one another and to the ring at the first connecting points, and
   (4) each strap of one of the two frames is connected to a respective strap of the other frame and to the transducer at said third connecting points.

7. A force measuring device as claimed in claim 18, wherein the force transmission device is connected to the ring by fasteners at the first connecting points and to the transducer by fasteners at the third connecting points.

8. A force measuring device as claimed in claim 7, wherein the fasteners are screws.

9. A force measuring device as claimed in claim 1, wherein:
   (1) the ring and the two force input members are formed by a one-piece body, the body having arms connected to the ring and projecting away therefrom, and
   (2) the frame is fixed, at each first connecting point, to an end of one of the arms which is opposite the ring and, measured along the axis, is a distance away from the ring.

10. A force measuring device as claimed in claim 9, wherein the frame consists of a material having a coefficient of thermal expansion that differs from the coefficient of thermal expansion of the material from which the ring and the arms are formed, and at least one arm engages a bimetallic element to compensate for forces caused by temperature changes, when the dimensional changes of the ring and of the frame differ from one another.

11. A force measuring device as claimed in claim 1, further comprising:
   a second force transmission device belonging to the transducer, and comprising:
      (1) two connecting members each connected to the first force transmission device at one of the third connecting points,
      (2) two holders, and
      (3) transmission members connecting the two holders to the connecting members such that a change in the distance between the two connecting members causes a change in the distance between the two holders,
   wherein the second force transmission device includes the transducing element and the elongated section is perpendicular to a plane passing through the third connecting points in the rest state.

12. A force measuring device as claimed in claim 11, wherein the force transducer includes permanent magnets creating a magnetic field that intersects the elongated section of the transducing element.

13. A force measuring device, comprising:
   (1) a one-piece body, comprising:
      (a) a ring having inner and outer sides, an axis and a circumference,
      (b) a first force input member connected to the outer side of the ring,
      (c) a second force input member connected to the inner side of the ring, such that the ring is deformed by forces applied by the first and second force input members, and (d) a plurality of arms distributed along the circumference of the ring and projecting away from the ring, each of the plurality of arms having an end which is opposite the ring and is separated from the ring by a distance;

(2) a force transmission device having a frame and two straps, (a) said frame being fixed at a plurality of first connecting points to the ends of the arms opposite the ring, the arms applying forces to deform the frame when the ring is deformed, and (b) each of said straps being connected to the frame at a respective second connecting point, each of the second connecting points being separated from each of the first connecting points by a distance; and (3) a force transducer to which each of said straps is connected at a third connecting point, said straps transmitting forces from the frame to said transducer when said frame is deformed, said transducer [being adapted to measure a force transmitted from the ring via the force transmission device]including:

(a) a transducing element that provides an electrical output signal. the output signal having a value which changes when input forces are applied to the transducing element, said value providing a measure of the input forces, and (b) means for applying the input forces to the transducing element when forces are transmitted from the frame to the tranducer via said straps.

14. A force measuring device as claimed in claim 13, wherein the frame and the straps are included in a one-piece lamina, the lamina has sections that include the first, second and third connecting points, and the frame and the straps have limbs which are connected via flexural joints to the lamina sections.

15. A force transmitting system, comprising: (1) a one-piece body, comprising:

(a) a ring having inner and outer sides and an axis, (b) a first force input member connected to the outer side of the ring, and (c) a second force input member connected to the inner side of the ring, such that the ring is deformed by forces applied in the direction of the axis by the first and second force input members;

(2) a force transmission device comprising a lamina that has a rest state in which said lamina lies in a plane perpendicular to the axis, said lamina including a frame and two straps, (a) said frame being connected to the one-piece body at a plurality of first connecting points, to deform the frame when the ring is deformed, (b) each of said straps being connected to the frame at a respective second connecting point, each of the second connecting points being separated from each of the first connecting points by a respective distance, (c) each of said straps having a third connecting point for connecting the strap to a force transducer, the strap transmitting input forces from the frame to the transducer in the direction of said plane when said frame is deformed, and (d) the frame and the straps having respective limbs that are connected via flexural joints to a plurality of sections of the lamina in which the first, second and third connecting points are located.

16. A force transmitting system according to claim 15, wherein:

(1) the ring has a circumference, (2) the one-piece body further comprises a plurality of ams distributed along the circumference of the ring and projecting away from the ring, each arm having an end which is opposite the ring and is separated from the ring by a distance, and (3) the first connecting points of the frame are connected to the body at the ends of the arms opposite the ring.

17. A force transmitting system according to claim 16, wherein the lamina further includes a respective hole at each first connecting point and at each third connecting point, and said lamina is connected to the arms by fasteners.

18. A force transmitting system as claimed in claim 17, wherein the fasteners are screws.

19. A force transmitting system according to claim 15, wherein the force transmission device comprises two laminae separated by a distance along the axis, the first, second and third connecting points of one of the laminae being aligned with the respective first second and third connecting points of the other lamina while the laminae are in the rest state, such that a line segment connecting any pair of aligned connecting points is parallel to the axis.

* * * * *

UNITED STATES PATENT AND TRADEMARK OFFICE
CERTIFICATE OF CORRECTION

PATENT NO.    : 5,379,653
DATED         : January 10, 1995
INVENTOR(S)   : Saner It is certified that error appears in the above-identified patent and that said Letters Patent is hereby corrected as shown below:

On the title page, item

[57] Abstract, after "outer sides of the ring." on line 5, delete

"The resistance is applied to a circuit to generate an electrical signal having a characteristic the value of which corresponds to the applied input force. As an alternative, the transducing element advantageously may be an elongated elastically stretchable carrier member having a strain gage mounted thereon. As a further alternative, the transducing element advantageously may be a piezoelectric crystal, or the like, provided with electrodes. Such a transducing element is mounted and held so as to generate an electrical signal in response to compression forces acting at the two holders.",

UNITED STATES PATENT AND TRADEMARK OFFICE
CERTIFICATE OF CORRECTION

PATENT NO.   : 5,379,653
DATED        : January 10, 1995
INVENTOR(S)  : Saner

It is certified that error appears in the above-identified patent and that said Letters Patent is hereby corrected as shown below:

and substitute therefor

--The device includes a force transmission device having a one-piece lamina. The lamina includes a frame and two straps formed together with the frame. The frame is connected to the ring. The straps are connected to a transducer. Preferably the transducer includes a string which vibrates during the measurement. The force transmission device can transmit forces from the ring to the transducer and thus particularly substantially prevent nonuniform deformations of the ring from causing measurement errors.--

UNITED STATES PATENT AND TRADEMARK OFFICE
CERTIFICATE OF CORRECTION

PATENT NO.    : 5,379,653
DATED         : January 10, 1995
INVENTOR(S)   : Saner It is certified that error appears in the above-identified patent and that said Letters Patent is hereby corrected as shown below:

In column 11, claim 1, after "A force measuring device, comprising:" on line 27, insert:

--(1) a ring which is coaxial with an axis and has inner and outer sides;

(2) a first force input member to which the outer side of the ring is connected;

(3) a second force input member to which the inner side of the ring is connected, such that the ring is deformed by forces transmitted by the first and second force input members;

(4) a force transducer comprising:

UNITED STATES PATENT AND TRADEMARK OFFICE
CERTIFICATE OF CORRECTION

PATENT NO. : 5,379,653
DATED : January 10, 1995
INVENTOR(S) : Saner

It is certified that error appears in the above-identified patent and that said Letters Patent is hereby corrected as shown below:

(a) an electrically conducting transducing element having an elongated section that has a rest state and lies in a plane that is perpendicular to the axis when the elongated section is in the rest state (i) the elongated section being subjected to a tensioning force and vibrating during a measurement at a resonant frequency that varies with the tensioning force, (ii) the transducing element providing electrical output signals representing the resonant frequency of the elongated section, and--

UNITED STATES PATENT AND TRADEMARK OFFICE
CERTIFICATE OF CORRECTION

PATENT NO.   : 5,379,653
DATED        : January 10, 1995
INVENTOR(S)  : Saner

It is certified that error appears in the above-identified patent and that said Letters Patent is hereby corrected as shown below:

In column 11, claim 2, line 48, delete "18" and substitute therefor --1--.

In column 11, claim 3, line 54, delete "18" and substitute therefor --1--.

In column 11, claim 5, line 65, delete "18" and substitute therefor --1--.

In column 12, claim 6, line 1, delete "18" and substitute therefor --1--.

In column 12, claim 7, line 13, delete "18" and substitute therefor --1--.

In column 13, claim 13, lines 23 and 24, delete "[being adapted to measure a force transmitted from the ring via the force transmission device]".

UNITED STATES PATENT AND TRADEMARK OFFICE
CERTIFICATE OF CORRECTION

PATENT NO.     : 5,379,653
DATED          : January 10, 1995
INVENTOR(S)    : Saner It is certified that error appears in the above-identified patent and that said Letters Patent is hereby corrected as shown below:

In column 14, claim 15, line 16, delete "tc" and substitute therefor --to--.

In column 14, claim 16, line 26, delete "ams" and substitute therefor --arms--.

Signed and Sealed this

Sixth Day of June, 1995

BRUCE LEHMAN

*Attest:*

*Attesting Officer*     *Commissioner of Patents and Trademarks*